(12) United States Patent
Lee

(10) Patent No.: US 9,506,265 B1
(45) Date of Patent: Nov. 29, 2016

(54) CROSS-TYPE EARTHQUAKE PLATFORM

(71) Applicant: Mao-Tu Lee, New Taipei (TW)

(72) Inventor: Mao-Tu Lee, New Taipei (TW)

( * ) Notice: Subject to any disclaimer, the term of this patent is extended or adjusted under 35 U.S.C. 154(b) by 0 days.

(21) Appl. No.: 15/146,850

(22) Filed: May 4, 2016

(51) Int. Cl.
*E04B 1/98* (2006.01)
*E04H 9/02* (2006.01)

(52) U.S. Cl.
CPC .............. *E04H 9/023* (2013.01); *E04B 1/985* (2013.01)

(58) Field of Classification Search
CPC .......... E04B 9/02; E04B 9/023; E04B 9/021; E04B 1/985
USPC ........................................................ 52/167.5
See application file for complete search history.

(56) References Cited

U.S. PATENT DOCUMENTS

| | | | | |
|---|---|---|---|---|
| 5,970,666 A | * | 10/1999 | Kurabayashi | ........... E04H 9/023 52/167.1 |
| 6,085,473 A | * | 7/2000 | Teramachi | .............. E04H 9/023 52/167.1 |
| 6,092,780 A | * | 7/2000 | Kurabayashi | ........... E04H 9/021 248/562 |
| 6,123,313 A | * | 9/2000 | Otsuka | .................... E04H 9/023 248/580 |
| 6,164,022 A | * | 12/2000 | Ishikawa | .................. B23Q 1/48 52/167.1 |
| 6,364,274 B1 | * | 4/2002 | Omi | ...................... F16F 15/022 248/562 |
| 7,340,864 B2 | * | 3/2008 | Teramachi | .............. E04H 9/023 52/167.1 |
| 2002/0166296 A1 | * | 11/2002 | Kim | ........................ E04H 9/023 52/167.5 |
| 2004/0146228 A1 | * | 7/2004 | Lee | ..................... F16C 29/0607 384/45 |
| 2005/0055896 A1 | * | 3/2005 | Teramachi | .............. E04H 9/023 52/167.1 |
| 2007/0130848 A1 | * | 6/2007 | Tsai | ........................ E04H 9/023 52/167.7 |
| 2007/0157532 A1 | * | 7/2007 | Tsai | ........................ E04H 9/023 52/167.1 |
| 2008/0120927 A1 | * | 5/2008 | Tsai | ........................ E04H 9/023 52/167.4 |

FOREIGN PATENT DOCUMENTS

JP   P3195512 B2   8/2001

* cited by examiner

*Primary Examiner* — Beth Stephan
(74) *Attorney, Agent, or Firm* — Pai Patent & Trademark Law Firm; Chao-Chang David Pai

(57) ABSTRACT

A cross-type earthquake platform includes a bearing block, two guide rails, two roller holders and multiple needle rollers. The bearing block has sliding grooves located at opposing top and bottom walls thereof and respectively extended in X-axis and Y-axis, and needle roller guide grooves located in horizontal bottom wall and upright sidewalls of each sliding groove. Each guide rail has needle roller guide grooves located at the top wall thereof. The needle rollers are mounted in the roller holders to support the guide rails at the opposite top and bottom walls of the bearing block. Further, retractable dust covers are respectively capped on the guide rails to protect the needle rollers against external dust.

9 Claims, 4 Drawing Sheets

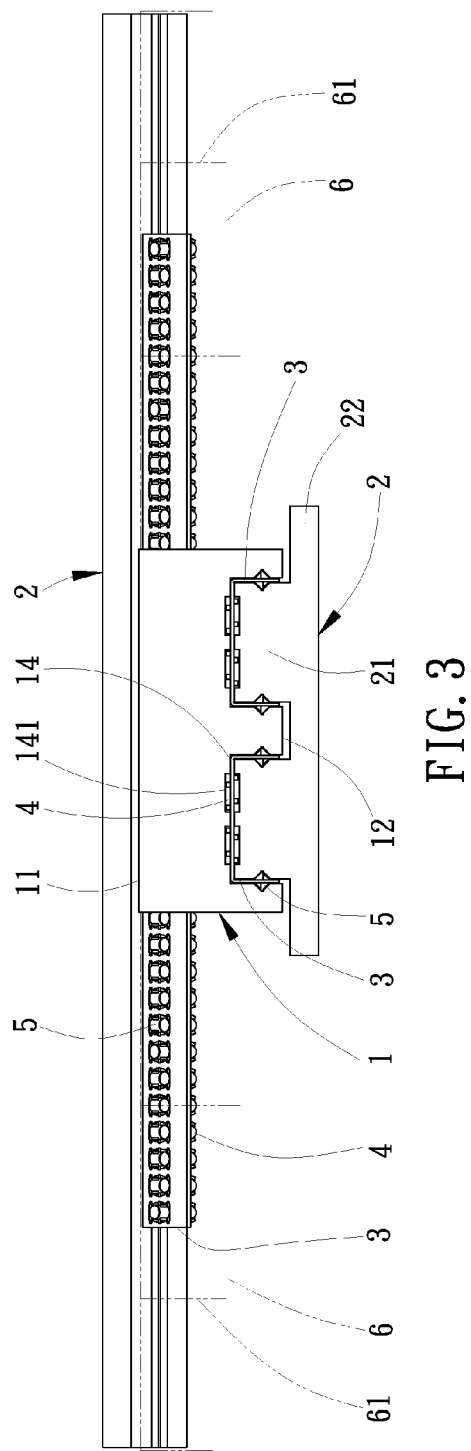
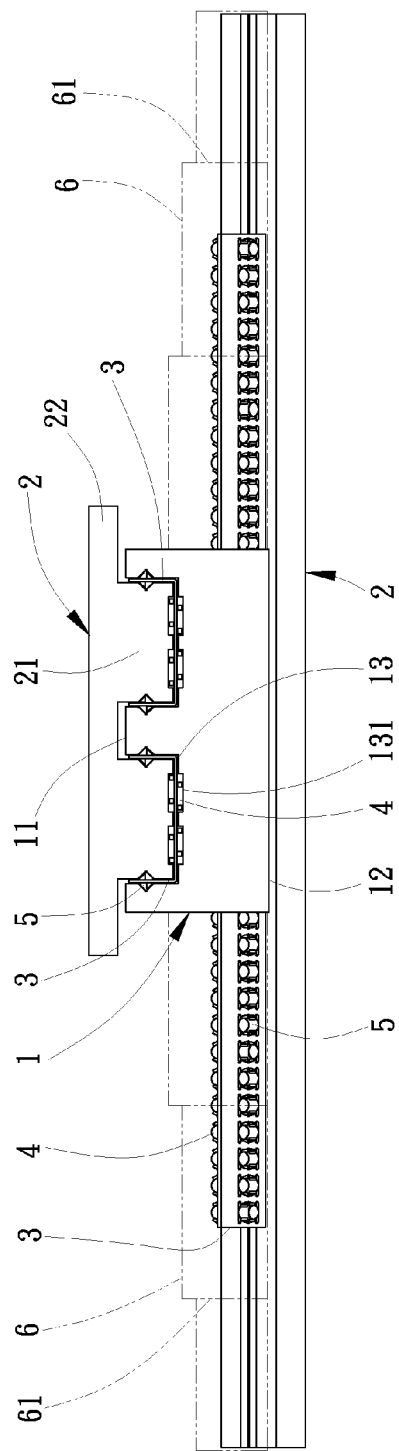

CROSS-TYPE EARTHQUAKE PLATFORM

BACKGROUND OF THE INVENTION (a) Field of the Invention

The present invention relates to earthquake platforms and more particularly to a cross-type earthquake platform, which is practical for use to bear a building, machine, cabinet or any other equipment, effectively protecting the load against the impact of earthquakes.

(b) Description of the Prior Art

Seismic activity is the perceptible shaking of the surface of the Earth, resulting from the sudden release of energy in the crust of the Earth that creates seismic waves. Earthquakes can be violent enough to cause casualties and extensive property damages. Damage to property and casualties are mostly caused by collapsed buildings and dumping heavy furniture. Even if the building did not collapse, dumping cabinets, shelves or other indoor items can cause personal injuries or property damages.

Japan is one of the most earthquake vulnerable countries in the world. Related industries in Japan have created various damping structures for use in building construction to withstand seismic shock. For example, Japan Patent 8-240033 discloses an earthquake resistant design for installation in a bottom side of a building to offset horizontal seismic forces, avoiding breaking of the pillars of the building in an earthquake and enhancing the seismic capacity of the building. This earthquake resistant design is to set a damping device between each column and each respective pillar. The damping device consists of multiple steel plates and plastic materials that are alternatively stacked together. The damping device has its bottom side thereof fixedly fastened to the top side of the pillar, and its top side fixedly fastened to the bottom side of the column. Thus, when an earthquake occurs, the damping device can offset horizontal seismic forces. However, because the damping device has multiple layers of plastic materials, the vertical load bearing efficacy of the damping device is limited. Further, the plastic materials have aging and cracking problems after a long use of the damping device, significantly affecting the performance of the damping device in load bearing.

Therefore, it is desirable to provide a durable and inexpensive earthquake platform for use in building construction, machines, cabinets, etc, to provide significant vertical and horizontal load bearing efficacy, avoiding casualties and extensive property damages in earthquakes.

SUMMARY OF THE INVENTION

The present invention has been accomplished under the circumstances in view. It is one object of the present invention to provide a cross-type earthquake platform, which utilizes the design of two interactive linear motion structures in a crossed manner to achieve earthquake protection and, which is inexpensive and highly durable, and practical for use to bear a building, machine, cabinet or any other equipment, effectively protecting the load against the impact of earthquakes and preventing separation of component parts.

To achieve this and other objects of the present invention, a cross-type earthquake platform comprises a bearing block having opposing top wall and bottom wall, two guide rails respectively slidably coupled to the opposing top wall and bottom wall of the bearing block, a plurality of roller holders respectively set between the bearing block and the guide rails, and a plurality of needle rollers accommodated in the roller holders and rotatably kept in contact between the bearing block and the guide rails. The bearing block comprises two pairs of parallel sliding grooves respectively located at the opposing top wall and bottom wall thereof in a crossed manner, at least one first needle roller guide groove disposed in a bottom wall of each sliding groove in parallel to the respective sliding groove, and a plurality of second needle roller guide grooves respectively disposed in opposing upright sidewalls of each sliding groove in parallel to the respective sliding groove. The guide rails are respectively slidably coupled to the sliding grooves of the bearing block, each comprising at least one third needle roller guide groove longitudinally located at a top wall thereof and disposed to face toward one respective first needle roller guide groove and a fourth needle roller guide groove longitudinally located at each of two opposite upright sidewalls thereof and respectively disposed to face toward one respective second needle roller guide groove. The needle rollers are respectively rotatably mounted in the roller holders, and respectively rotatably accommodated between the first needle roller guide grooves and the third needle roller guide grooves and between the second needle roller guide grooves and the fourth needle roller guide grooves for enabling the guide rails to be moved relative to each other on the opposing top wall and bottom wall of the bearing block.

Further, the first needle roller guide grooves and the third needle roller guide grooves are rectangular guide grooves with a rectangular cross section.

Further, the second needle roller guide grooves and the fourth needle roller guide grooves are V-shaped guide grooves with a V-shaped cross section.

Further, the roller holders are channel bars, each comprising a plurality of first position-limiting holes defined in a top wall thereof and respectively disposed to face toward the first needle roller guide grooves, and a plurality of second position-limiting holes defined in each of two opposite upright sidewalls thereof and respectively disposed to face toward the second needle roller guide grooves. The needle rollers are respectively rotatably accommodated in the first position-limiting holes and the second position-limiting holes.

Further, the needle rollers in the second position-limiting holes are disposed at right angles in a staggered manner.

Preferably, each roller holder further comprises a plurality of position-limiting flanges respectively extended around the first position-limiting holes and the second position-limiting holes and adapted for stopping the respective needle rollers in the respective first position-limiting holes and second position-limiting holes.

Preferably, each guide rail comprises a base panel and the respective guide ribs that are located at one of opposing top and bottom walls of the base panel and slidably coupled to the respective sliding grooves. The third needle roller guide grooves are located at respective top walls of the respective guide ribs. The fourth needle roller guide grooves are respectively located at respective opposing upright sidewalls of the respective guide ribs.

Preferably, the base panel comprises a plurality of mounting through holes cut through the opposing top and bottom walls thereof and arranged along two opposite side edges thereof.

Preferably, the cross-type earthquake platform further comprises a dust cover capped on each guide rail. The dust cover comprises a plurality of inverted-U-shaped cover components that are movably coupled to one another in a telescopic configuration or bellows configuration.

In application, the guide rail at the top wall of the bearing block can be affixed to a bottom side of a building, machine, cabinet, etc., and the guide rail at the bottom wall of the bearing block can be affixed to the foundation of the building or the floor. If the foundation of the building or the floor is vibrated upon an earthquake, the guide rails of the cross-type earthquake platforms will be forced to slide relative to the respective bearing blocks in reverse to the directions of the seismic waves to offset and balance the seismic waves, protecting the building, machine or cabinet against the impact of the earthquake. Further, because needle rollers are horizontally accommodated between the first needle roller guide grooves and the third needle roller guide grooves, the cross-type earthquake platform has a significant vertical load bearing efficacy. Further, because needle rollers are accommodated in the second position-limiting holes of the roller holder at right angles in a staggered manner, the needle rollers are respectively rotatably arranged between the second needle roller guide grooves and the fourth needle roller guide grooves at right angles in a staggered manner, and therefore the cross-type earthquake platform has a significant vertical load bearing and horizontal load bearing efficacy, preventing separation between the bearing block and the guide rails upon vibration.

BRIEF DESCRIPTION OF THE DRAWINGS

FIG. 3 is a schematic front view of the cross-type earthquake platform in accordance with the present invention.

FIG. 4 is a schematic side view of the cross-type earthquake platform in accordance with the present invention.

DETAILED DESCRIPTION OF THE PREFERRED EMBODIMENTS

Figure 1:
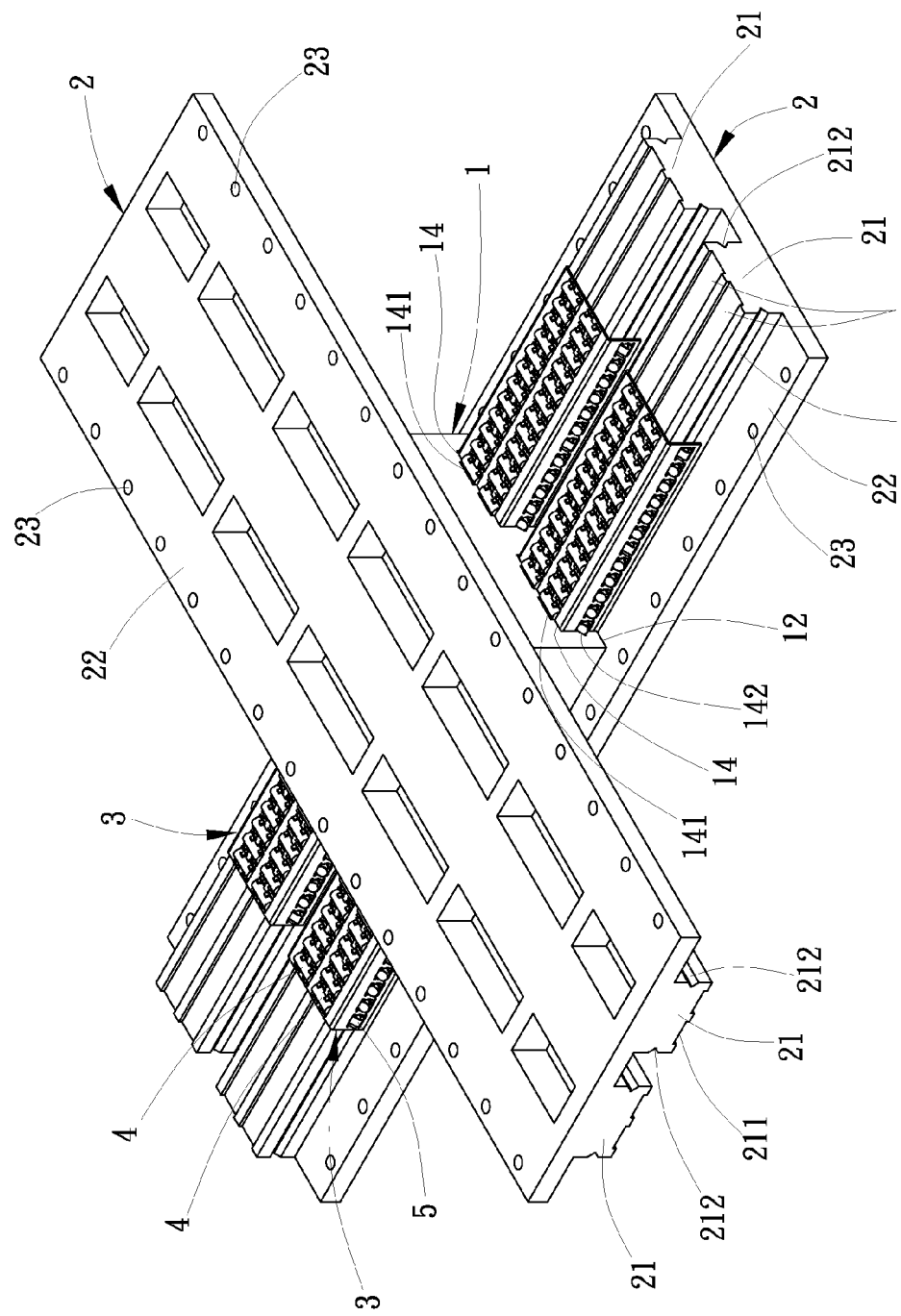
FIG. 1 is an oblique top elevational view of a cross-type earthquake platform in accordance with the present invention.
Figure 2:
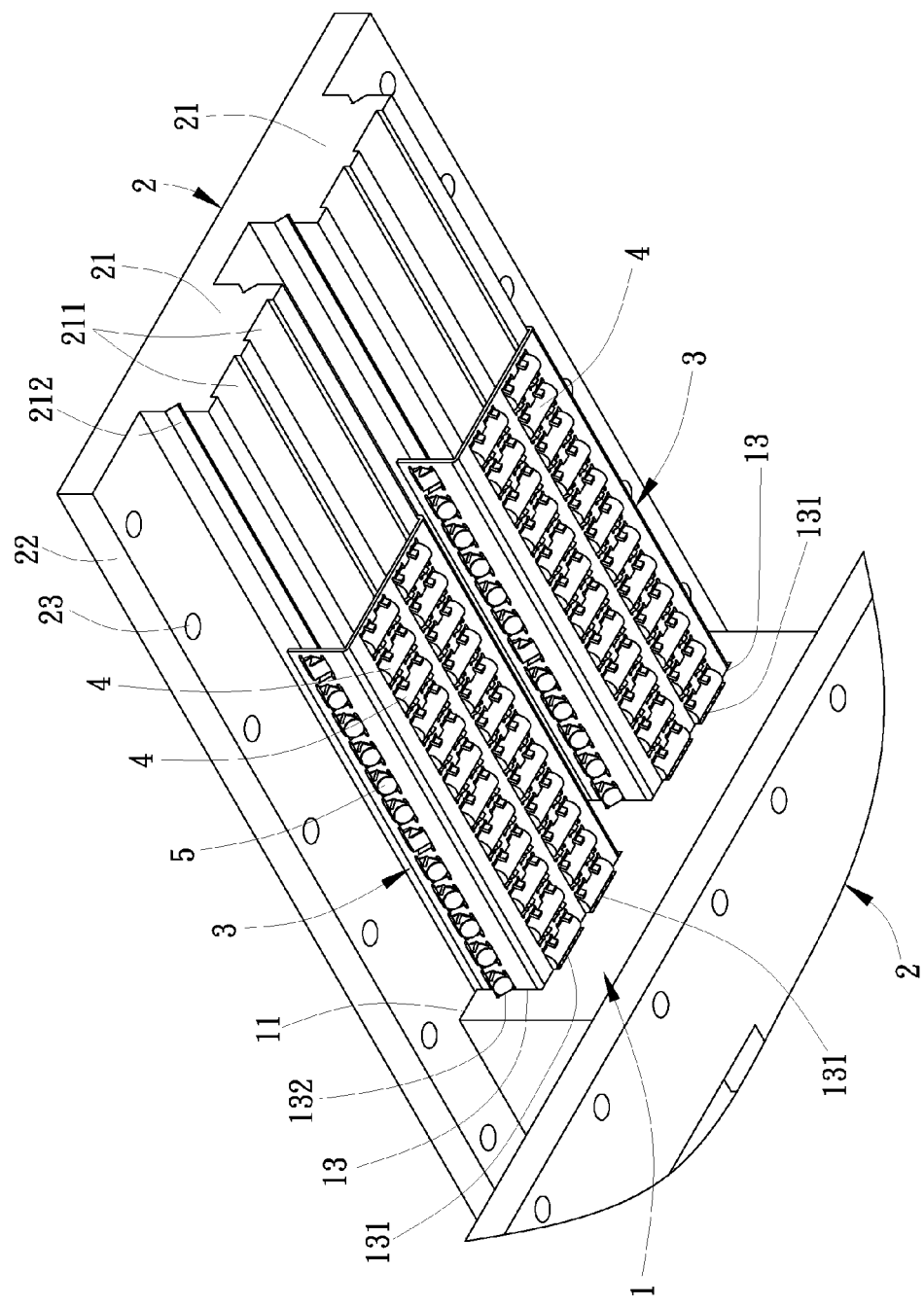
FIG. 2 is an oblique bottom elevational view of a part of the cross-type earthquake platform in accordance with the present invention.

Referring to FIGS. 1 and 2, a cross-type earthquake platform in accordance with the present invention is shown. The cross-type earthquake platform is adapted for supporting building pillars or beams, machines and tools, kitchen cabinets, etc. The cross-type earthquake platform comprises a bearing block 1, two guide rails 2 respectively and slidably coupled to opposing top and bottom sides of the bearing block 1 in a crossed manner, a plurality of roller holders 3 set between the bearing block 1 and each guide rail 2, and a plurality of needle rollers 4,5 mounted in the roller holders 3 and rotatably kept in contact between the bearing block 1 and the guide rails 2 for enabling the guide rails 2 to slide relative to the bearing block 1.

The bearing block 1 is a rectangular metal block member, as shown in FIGS. 1-4, comprising two pairs of parallel sliding grooves 13,14 respectively located in opposing top wall 11 and bottom wall 12 thereof. The sliding grooves 13 extend in X-axis across two opposite side edges of the top wall 11 of the bearing block 1. The sliding grooves 14 extend in Y-axis across two opposite side edges of the bottom wall 12 of the bearing block 1. The bearing block 1 further comprises a plurality of first needle roller guide grooves 131,141 respectively located in respective horizontal bottom walls of the sliding grooves 13,14 at a bottom side in a parallel manner relative to the associated sliding grooves 13,14, and a plurality of second needle roller guide grooves 132,142 respectively located in respective opposite upright sidewalls of the sliding grooves 13,14 in a parallel manner relative to the associated sliding grooves 13,14.

The guide rails 2 are elongated rails, as illustrated in FIGS. 1-4, each comprising two guide ribs 21 longitudinally located at one side thereof and slidably coupled to the two sliding grooves 13 or 14 at the top or bottom wall of the bearing block 1, at least one, for example, two third needle roller guide grooves 211 longitudinally located at a top wall of each guide rib 21 corresponding to the respective first needle roller guide grooves 131,141, and a fourth needle roller guide groove 212 longitudinally located at each of two opposite upright sidewalls of each guide rib 21 corresponding to the respective second needle roller guide grooves 132,142.

Figure 5:
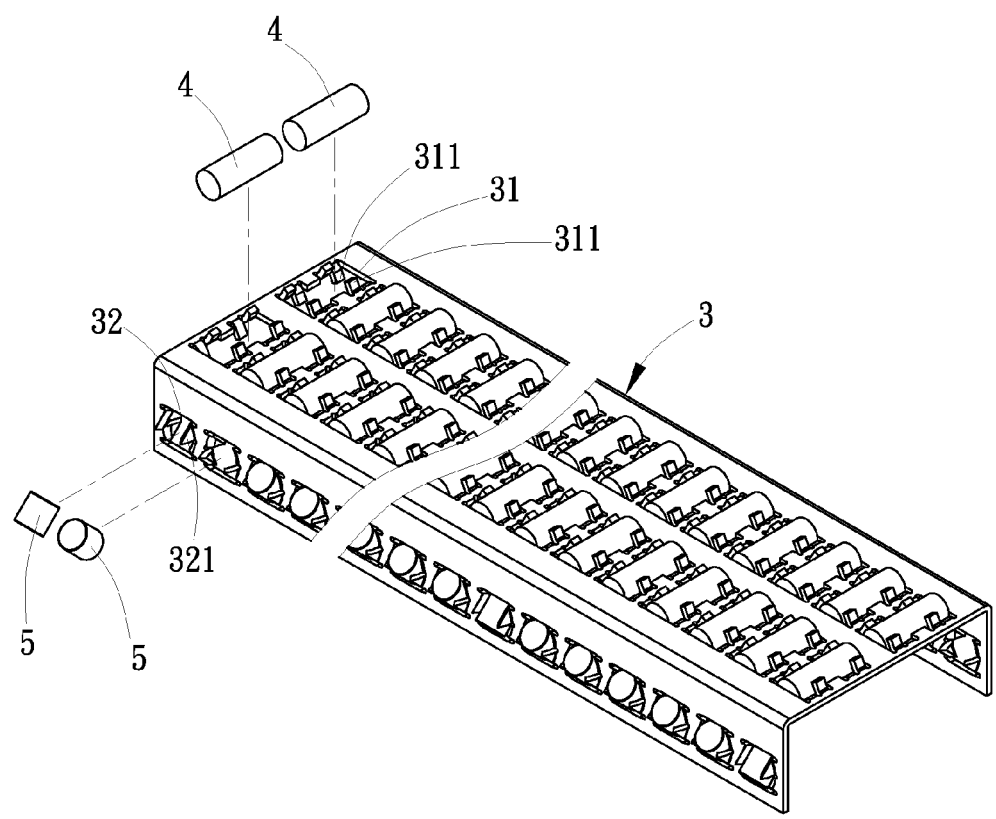
FIG. 5 is a schematic exploded view of a part of the present invention, illustrating the relationship between the roller holder and the respective needle rollers.

The roller holders 3 are channel bars made out of metal by stamping, as shown in FIGS. 1, 2 and 5. Alternatively, the roller holders 3 can be made from plastic by injection molding. Further, the roller holders 3 are respectively set between the guide ribs 21 of the guide rails 2 and the sliding grooves 13,14 of the bearing block 1, each comprising a plurality of first position-limiting holes 31 defined in a top wall thereof and respectively disposed to face toward the first needle roller guide grooves 131,141, a plurality of second position-limiting holes 32 defined in each of two opposite upright sidewalls thereof and respectively disposed to face toward the second needle roller guide grooves 132,142, and a plurality of position-limiting flanges 311,321 respectively extended around the first position-limiting holes 31 and the second position-limiting holes 32 and adapted for stopping the needle rollers 4,5 in the first position-limiting holes 31 and the second position-limiting holes 32.

The needle rollers 4,5 are cylindrical rollers, as illustrated in FIG. 1, FIG. 2 and FIG. 5, wherein the needle rollers 4 are respectively rotatably accommodated in the first position-limiting holes 31 in the top walls of the roller holders 3; the needle rollers 5 are respectively rotatably accommodated in the second position-limiting holes 32 at the opposing upright sidewalls of the roller holders 3. Thus, the needle rollers 4 are respectively rotatably arranged between the first needle roller guide grooves 131,141 and the third needle roller guide grooves 211; the needle rollers 5 are respectively rotatably arranged between the second needle roller guide grooves 132,142 and the fourth needle roller guide groove 212. After installation of the cross-type earthquake platform, the two guide rails 2 are relatively slidable on the opposing top wall 11 and bottom wall 12 of the bearing block 1.

Further, as illustrated in FIG. 1, FIG. 2 and FIG. 5, the first needle roller guide grooves 131,141 of the bearing block 1 and the third needle roller guide grooves 211 of the guide rails 2 are rectangular guide grooves with a rectangular cross section; the needle rollers 4 are horizontally accommodated between the first needle roller guide grooves 131,141 and the third needle roller guide grooves 211; thus, the cross-type earthquake platform has a significant vertical load bearing efficacy. Further, the second needle roller guide grooves 132,142 of the bearing block 1 and the fourth needle roller guide grooves 212 of the guide rails 2 are V-shaped guide grooves with a V-shaped cross section; the needle rollers 5 are respectively accommodated in the second position-limiting holes 32 of the roller holder 3 wherein the second position-limiting holes 32 are arranged in two rows in a staggered manner at right angles; the extending direction of the needle rollers 5 in one row of second position-limiting holes 32 and the extending direction of the needle rollers 5 in the other row of second position-limiting holes 32 are at right angleslı; thus, the needle rollers 5 are respectively rotatably arranged between the second needle roller guide grooves 132,142 and the fourth needle roller guide grooves 212 at right angles in a staggered manner, and therefore the cross-type earthquake platform has a significant vertical load bearing and horizontal load bearing efficacy, preventing separation between the bearing block 1 and the guide rails 2 upon vibration.

Further, as illustrated in FIG. 1 and FIG. 2, each guide rail 2 preferably comprises a base panel 22, the respective said guide ribs 21 installed in one side of the base panel 22 (alternatively, one side of the base panel 2 can be processed to provide the respective said guide ribs 21), and a plurality of mounting through hole 23 cut through the opposing top and bottom walls of the base panel 22 and arranged along each of two opposite side edges of the base panel 22 for the mounting of respective fastening members. Thus, the base panel 22 of the guide rail 2 at the top wall 11 of the bearing block 1 can be affixed to a bottom side of a building, machine, cabinet, etc.; the base panel 22 of the guide rail 2 at the bottom wall 12 of the bearing block 1 can be affixed to the foundation of the building or the floor.

Further, as illustrated in FIG. 3 and FIG. 4, in order to protect the needle roller guide grooves, roller holders 3 and needle rollers 4,5 of the cross-type earthquake platform and to maintain sliding precision between the bearing block 1 and the guide rails 2, a dust cover 6 is capped on each guide rail 2. The dust covers 6 are substantially inverted-U-shaped covers, each consisting of a plurality of inverted-U-shaped cover components 61 that are movably coupled to one another in a telescopic configuration. Alternatively, the inverted-U-shaped cover components 61 can be arranged in a bellows configuration. The dust covers 6 each have one end thereof affixed to the respective guide rails 2, and an opposite end thereof respectively affixed to the bearing block 1. Thus, the dust covers 6 can protect the needle roller guide grooves, roller holders 3 and needle rollers 4,5 of the cross-type earthquake platform against outside dust and maintain the precision of the cross-type earthquake platform without affecting relative sliding movement between the bearing block 1 and the guide rails 2 to absorb shocks.

When applying the cross-type earthquake platform of the present invention to an earthquake-resistant building construction, affix the guide rail 2 at the bottom wall 12 of the bearing block 1 to the foundation or lower beam of the building, and then affix the guide rail 2 at the top wall 11 of the bearing block 1 to the bottom side of a column or upper beam, enabling the column or upper beam of the building to be linked to the foundation or lower beam by the cross-type earthquake platform. Further, multiple cross-type earthquake platforms can be set in the building at selected locations, enabling the weight of the building to be evenly distributed through the cross-type earthquake platforms. If the foundation or lower beams of the building are vibrated upon an earthquake, the guide rails 2 of the cross-type earthquake platforms will be forced to slide relative to the respective bearing blocks 1 opposite to the directions of the seismic waves to offset and balance the seismic waves, protecting the building against the impact of the earthquake. The cross-type earthquake platform of the present invention can also be applied to precision machines, precious display articles (expensive wine coolers, antique cabinets, etc.) to protect them against the impact of earthquakes, ensuring earthquake safety.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cross-type earthquake platform, comprising a bearing block having opposing top wall and bottom wall, two guide rails respectively slidably coupled to the opposing top wall and bottom wall of said bearing block, a plurality of roller holders respectively set between said bearing block and said guide rails, and a plurality of needle rollers accommodated in said roller holders and rotatably kept in contact between said bearing block and said guide rails, wherein said bearing block comprises two pairs of parallel sliding grooves respectively and symmetrically located at the opposing top wall and bottom wall thereof in a crossed manner, at least one first needle roller guide groove disposed in a bottom wall of each said sliding groove in parallel to the respective said sliding groove, and a second needle roller guide groove disposed in each of two opposing upright sidewalls of each of said sliding grooves in parallel to the respective said sliding groove; said guide rails are respectively slidably coupled to said sliding grooves of said bearing block, each said guide rail comprising at least one third needle roller guide groove longitudinally located at a top wall thereof and disposed to face toward one respective said first needle roller guide groove, and a fourth needle roller guide groove longitudinally located at each of two opposite upright sidewalls thereof and respectively disposed to face toward one respective said second needle roller guide groove; said needle rollers are respectively rotatably mounted in said roller holders and respectively rotatably accommodated between said first needle roller guide grooves and said third needle roller guide grooves and between said second needle roller guide grooves and said fourth needle roller guide grooves for enabling said guide rails to be moved relative to each other on the opposing top wall and bottom wall of said bearing block.

2. The cross-type earthquake platform as claimed in claim 1, wherein said first needle roller guide grooves and said third needle roller guide grooves are rectangular guide grooves with a rectangular cross section.

3. The cross-type earthquake platform as claimed in claim 1, wherein said second needle roller guide grooves and said fourth needle roller guide grooves are V-shaped guide grooves with a V-shaped cross section.

4. The cross-type earthquake platform as claimed in claim 1, wherein each of said roller holders comprises a plurality of first position-limiting holes defined in a top wall thereof and respectively disposed to face toward said first needle roller guide grooves, and a plurality of second position-limiting holes defined in each of two opposite upright sidewalls thereof and respectively disposed to face toward said second needle roller guide grooves; said needle rollers are respectively rotatably accommodated in said first position-limiting holes and said second position-limiting holes.

5. The cross-type earthquake platform as claimed in claim 4, wherein said second position-limiting holes are arranged in two rows in a staggered manner at right angles; the extending direction of the said needle rollers in one said row of second position-limiting holes and the extending direction of said needle rollers in the other said row of second position-limiting holes are at right angles.

6. The cross-type earthquake platform as claimed in claim 4, wherein each said roller holder further comprises a plurality of position-limiting flanges respectively extended around said first position-limiting holes and said second position-limiting holes and adapted for stopping the respective said needle rollers in the respective said first position-limiting holes and said second position-limiting holes.

7. The cross-type earthquake platform as claimed in claim 1, wherein each said guide rail comprises a base panel and a plurality of guide ribs located at one of opposing top and bottom walls of said base panel and slidably coupled to the respective said sliding grooves; said third needle roller guide grooves are located at respective top walls of the respective said guide ribs; said fourth needle roller guide grooves are respectively located at respective opposing upright sidewalls of the respective said guide ribs.

8. The cross-type earthquake platform as claimed in claim 7, wherein said base panel comprises a plurality of mounting through holes cut through the opposing top and bottom walls thereof and arranged along two opposite side edges thereof.

9. The cross-type earthquake platform as claimed in claim 1, further comprising a dust cover capped on each said guide rail, said dust cover comprising a plurality of inverted-U-shaped cover components that are movably coupled to one another in one of a telescopic configuration and a bellows configuration.

* * * * *